United States Patent [19]

Jury

[11] Patent Number: 4,874,400
[45] Date of Patent: Oct. 17, 1989

[54] METHOD OF AND APPARATUS FOR REMOVING GASEOUS POLLUTANTS FROM EXHAUST GASES

[75] Inventor: Egon Jury, Egelsbach, Fed. Rep. of Germany

[73] Assignee: Metallgesellschaft Aktiengesellschaft, Frankfurt am Main, Fed. Rep. of Germany

[21] Appl. No.: 244,666

[22] Filed: Sep. 14, 1988

[30] Foreign Application Priority Data

Sep. 25, 1987 [DE] Fed. Rep. of Germany ....... 3732353

[51] Int. Cl.$^4$ .......................... B01D 47/16; B03C 3/01
[52] U.S. Cl. ............................................. 55/8; 55/10; 55/92; 55/107; 55/122; 55/127; 55/223; 55/230; 55/237
[58] Field of Search .................... 55/8, 10, 20, 68, 71, 55/73, 84, 92, 107, 122, 127, 223, 230, 236–238, 260; 261/18.1, 84, 89, 90

[56] References Cited

U.S. PATENT DOCUMENTS

| | | | |
|---|---|---|---|
| 1,329,737 | 2/1920 | Wolcott | 55/10 |
| 1,468,118 | 9/1923 | MacLachlan | 261/89 X |
| 1,823,844 | 9/1931 | Riley | 261/18.1 X |
| 1,973,051 | 9/1934 | Doolittle | 261/89 X |
| 2,931,458 | 4/1960 | Vane | 55/122 |
| 3,016,979 | 1/1962 | Schmid | 55/10 |
| 3,885,918 | 5/1975 | Isahaya | 55/238 X |
| 4,204,844 | 5/1980 | Pilat | 55/8 X |
| 4,229,192 | 10/1980 | Calaceto | 55/238 |
| 4,229,411 | 10/1980 | Kisters et al. | 55/122 X |
| 4,246,242 | 1/1981 | Butler et al. | 261/89 X |
| 4,380,491 | 4/1983 | Joy et al. | 261/89 X |
| 4,400,184 | 8/1983 | Tomita et al. | 55/122 X |
| 4,530,822 | 7/1985 | Ashley et al. | 55/8 X |
| 4,682,991 | 7/1987 | Grethe et al. | 55/238 X |
| 4,762,538 | 8/1988 | Michler et al. | 261/84 X |

FOREIGN PATENT DOCUMENTS 870252  3/1942  France .................... 261/89

*Primary Examiner*—Robert Spitzer
*Attorney, Agent, or Firm*—Herbert Dubno; Jonathan Myers

[57] ABSTRACT

A method of treating an exhaust gas stream in a spray absorber with water and suspended reactants, is disclosed by introducing the water and the reactants, which are suspended in a liquid, through separate lines and distributors into a rotary atomizing disk, mixing them in the disk and jointly spraying them into the exhaust gas stream. Furthermore, an apparatus is disclosed which serves to carry out the process and in which two or more feeders which do not rotate with the conventional atomizing disk, are disposed above the disk and serve to separately feed treating agents into the reservoir of the atomizing disk.

10 Claims, 3 Drawing Sheets

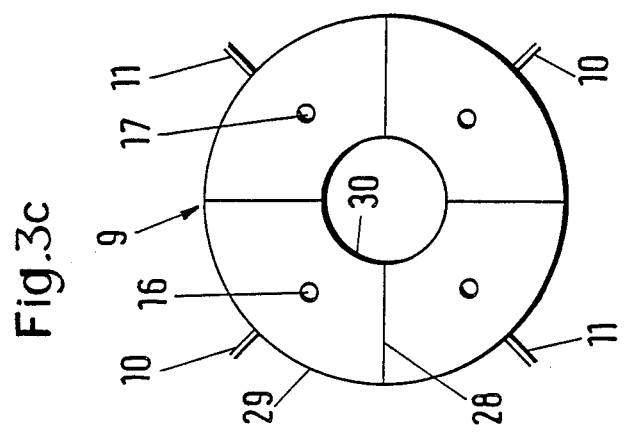
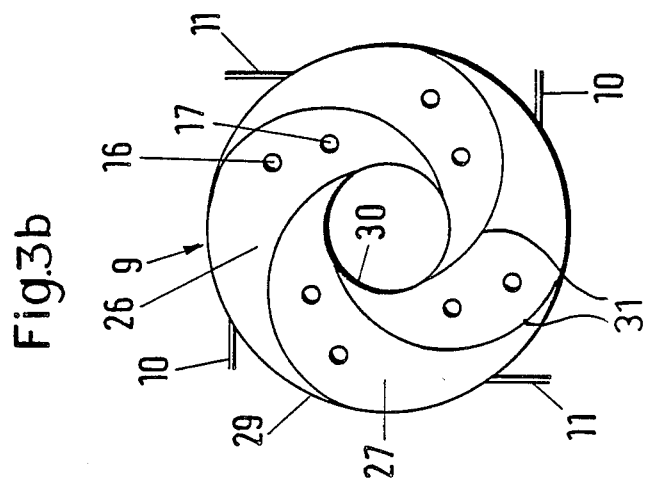
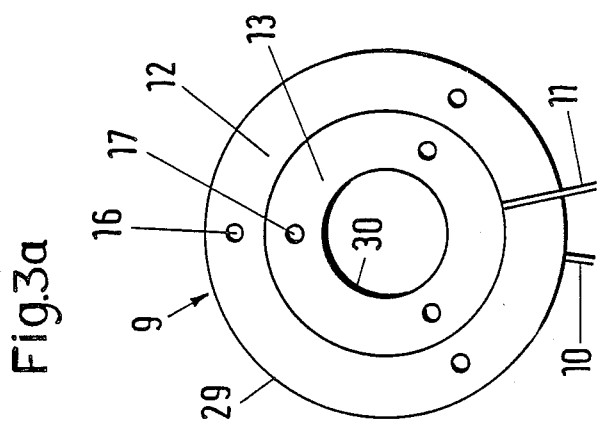

METHOD OF AND APPARATUS FOR REMOVING GASEOUS POLLUTANTS FROM EXHAUST GASES

FIELD OF THE INVENTION

My present invention relates to a process for treating an exhaust gas stream, e.g. in a flue gas, in a spray absorber, wherein the exhaust gas stream is cooled to a suitable temperature by an introduction of water, gaseous pollutants, such as $SO_2$, HCl, HF, etc., are combined by an introduction of reactants which are suspended in a liquid and the resulting particles are separated from the exhaust gas stream by a dust collector, such as an electrostatic precipitator. The invention relates also to an apparatus for carrying out the process.

The process of the kind described is used to clean exhaust gases, particularly to clean flue gases which are formed in refuse incinerators and contain pollutants such as $CO_2$, HCl and HF, in high concentrations.

Lime or lime-containing agents are often used as absorbents for that purpose and are finely ground and in most cases are suspended in water.

As so-called milk of lime, the absorbent can be atomized to form a fine spray, which is introduced into the exhaust gas stream.

In general, a constant solids concentration is maintained in the milk of lime and the demand for reactants is met by a supply of milk of lime at a controlled rate.

In many cases, the spray absorber is also used to perform a second function, namely, to cool the flue gas stream to a certain temperature independently of the supply of milk of lime because the utilization of the reactants is higher at lower temperatures.

For this purpose, the prior art calls for an admixing of cooling water to the stream of milk of lime at a rate which is controlled in dependence on the cooling which is required.

It has been found in such processing that part of the milk of lime can react with the hardening constituents of the water and the resulting reaction products will deposit in the supply line and in the rotary atomizer so that the control of the entire plant and in the course of time, the operation of the plant will be disturbed.

OBJECTS OF THE INVENTION

It is an object of the invention to provide an improved method of cleaning gases such that the various treating agents can be introduced into a spray absorber used for a purification of exhaust gases that any disturbance of the continuous operation will be minimized, a pretreatment of water will not be required and the overall process does not become uneconomical for other reasons.

Another object is to provide a method of and an apparatus for cleaning gases whereby the aforedescribed drawbacks can be obviated.

SUMMARY OF THE INVENTION

It has surprisingly been found that the disadvantages which have been described can be avoided in a relatively simple manner in that the water and the reactants which are suspended in a liquid are introduced through separate lines and distributors into a rotating atomizing disk and are mixed in said disk and are jointly sprayed into the exhaust gas stream.

The short common residence time in the reservoir of the atomizing disk and the conditions of flow prevailing in that reservoir will ensure that the reaction products formed as the water is mixed with the suspended reactants will not be able to deposit anywhere along the path along which they flow jointly before entering the gas stream.

Any products of any reactions which occur within the relatively short time will be entrained by a highly accelerated mixed stream and the solid particles contained in said stream will contribute to the eroding action of said stream along the short remaining flow path which is jointly traversed so that there can be no formation of deposits at least in the regions which are required for the flow and any deposits formed in still regions will not adversely affect the operation of the plant.

In method terms, the invention comprises:
(a) treating said gas stream in a spray absorber by
($a_1$) rotating an atomizing disk in said absorber,
($a_2$) introducing separately into said disk water and a suspension in a liquid of particles capable of reacting with said gaseous pollutant to absorb said gaseous pollutant in said particles, and
($a_3$) discharging into said gas stream in said absorber in an atomized spray, a mixture of the water and the suspension from atomizing nozzles of said disk during the rotation thereof to cool said gas stream and take up said gaseous pollutant in said particles while suspending said particles in said gas stream; and
(b) thereafter collecting said particles from said gas stream in a dust collector.

In apparatus terms, the invention comprises:
a spray absorber including:
means forming an absorber chamber having a gas inlet and a gas outlet and adapted to be traversed by an exhaust gas stream introduced at said inlet,
a rotating atomizing disk centrally disposed in said chamber and having a vertical axis,
means including respective nonrotatable feeders disposed above said disk for separately introducing into said rotating disk water and a suspension in a liquid of particles capable of reacting with said gaseous pollutant to absorb said gaseous pollutant in said particles, and
means on said disk for discharging into said gas stream in said absorber in an atomized spray, a mixture of the water and the suspension from said disk during the rotation thereof to cool said gas stream and take up said gaseous pollutant in said particles while suspending said particles in said gas stream; and
a dust collector connected to said outlet and traversed by said gas stream downstream of said spray absorber for removing said particles from said gas stream.

In accordance with a further feature of the process, further treating agents are supplied via separate lines and are subsequently mixed and jointly sprayed into the exhaust gas stream.

Within the scope of the invention the process and the apparatus may be used to mix substances whose mixing can result in a formation of deposits, in a strong change of viscosity, in a generation of reaction heat and/or in a formation of gaseous components and/or aggressive substances.

The process can be carried out by an apparatus which comprises a spray absorber provided near its top with the centrally disposed rotary atomizer having a vertical axis of rotation, a gas inlet opening which is concentric thereto, and a gas discharge passage connected to the lower portion of the absorber. A conventional atomizing disk is here provided, which comprises a reservoir and horizontal outlet bores, and two or more feeders, which do not rotate with the atomizing disk, are disposed above said disk and serve for separately supplying treating agents into the reservoir of the atomizing disk.

The feeders may comprise individual chambers, which are separated from each other and are connected to respective supply lines, and each of said chambers may be formed at its bottom with at least one opening leading to the reservoir of the atomizing disk. Alternatively, the feeders are constituted by a chamber, which has the shape of the circular ring and is centered on the axis of rotation and divided by partitions into compartments, each of which is connected to a supply line and provided with a bottom opening. The mixing may be improved in that the partitions are radial or spiral-shaped or concentric.

BRIEF DESCRIPTION OF THE DRAWING

The above objects, features and advantages of my invention will become more readily apparent from the following description, reference being made to the accompanying drawing in which:

FIGS. 3a to 3c are diagrammatic plan views showing various possible arrangements of the partitions in feed chambers having the shape of a circular ring.

SPECIFIC DESCRIPTION

Figure 1:
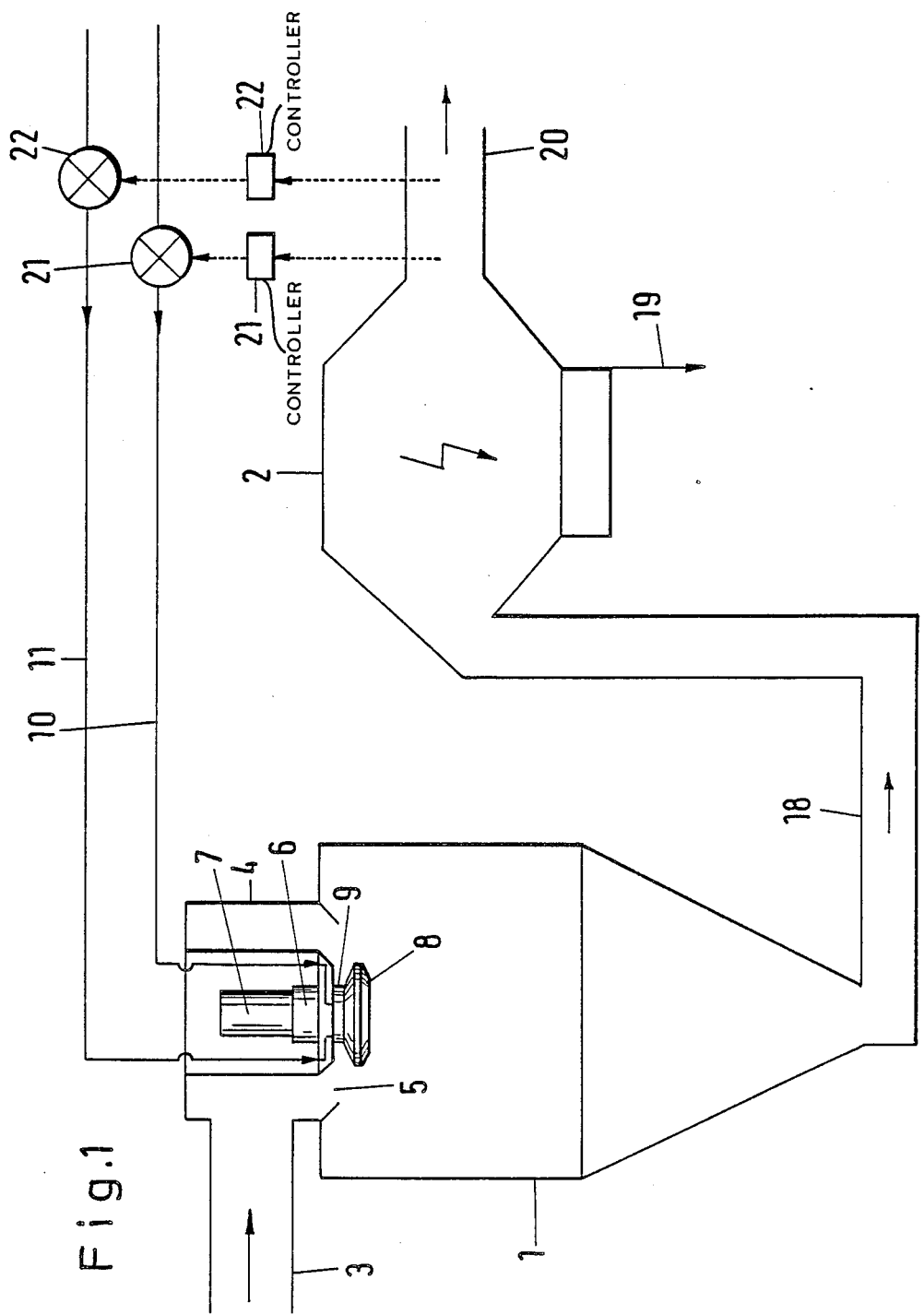
FIG. 1 is a flow diagram illustrating the process in accordance with the invention.

FIG. 1 is a diagrammatic, highly simplified representation of an illustrative embodiment of means for treating an exhaust gas stream. The apparatus essentially consists of a spray absorber 1 and a dust-collecting electrostatic precipitator 2.

Exhaust gas is supplied to the spray absorber 1 in a line 3 and is deflected in the superstructure 4 and is introduced through the cylindrical gas feeder 5 with a swirl into the main chamber of the spray absorber 1.

A rotary atomizer 6 connected to an external drive 7 is centrally disposed in the spray absorber 1 near its top.

A feeder structure 9, which does not rotate with the atomizing disk 8, is disposed above the atomizing disk 8 and may be supplied with various treating agents through lines 10 and 11. The feeder structure 9 may consist of two concentric annular ducts 12, 13 (FIG. 2), each of which is provided at its top with an inlet opening 14, 15 and at its bottom with one or more outlet openings 16, 17.

In the spray absorber 1, the exhaust gas is mixed with the treating agents which have been introduced through the atomizing disk 8 and gaseous pollutants are combined with the reactants. The exhaust gas leaves the spray absorber 1 through the line 18 and is supplied to the dust-collecting electrostatic precipitator 2, in which the pollutant particles are separated and are subsequently removed from the system via line 19.

The temperature and the residual dust content of the cleaned exhaust gas are measured in the line 20.

In dependence on the results of the measurement, the supply of the treating agents is controlled by the control units 21, 22. The rate of the suspended reactants will depend on the residual pollutant content and the supply of water will be controlled in dependence on temperature.

Figure 2:
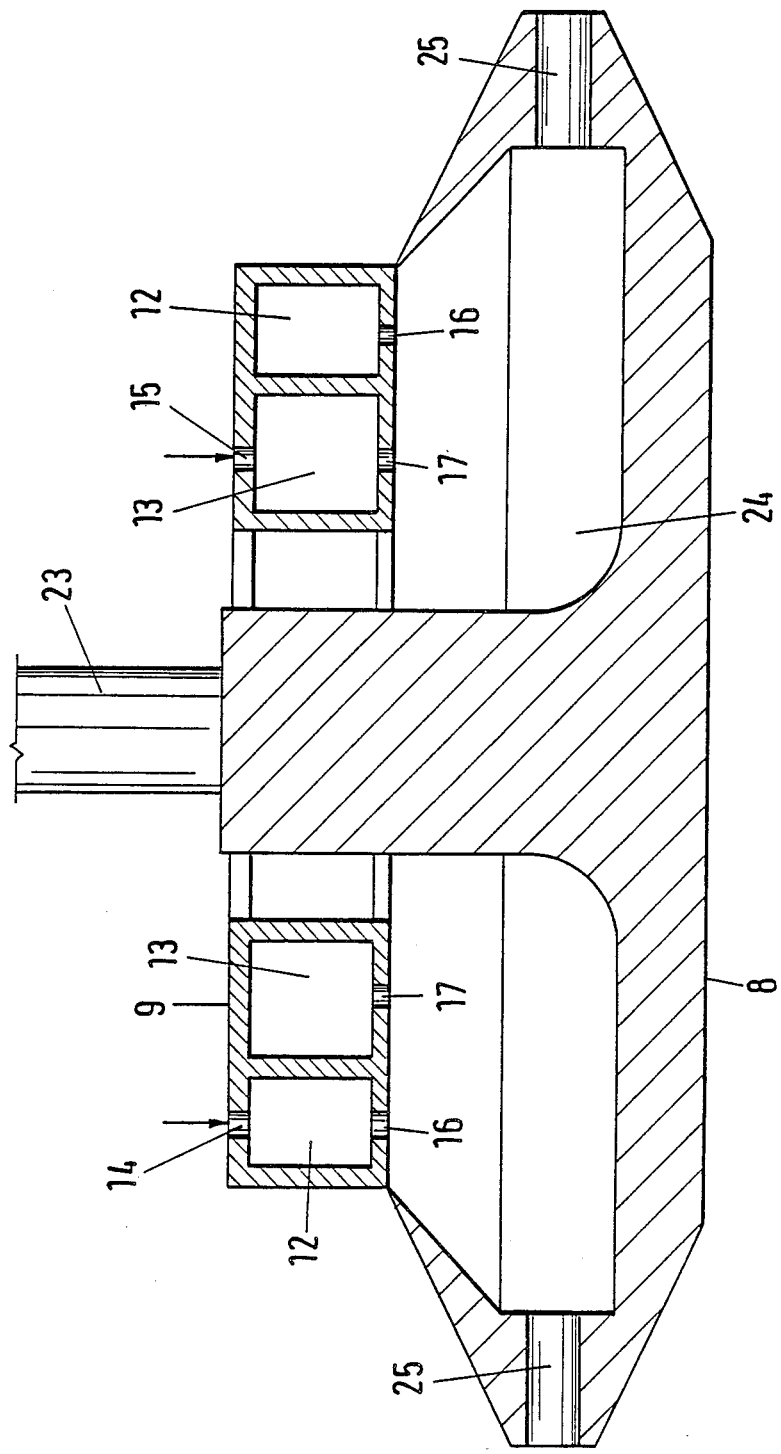
FIG. 2 is a sectional view showing an atomizing disk and feeders disposed above said disk.

FIG. 2 is a sectional view showing an atomizing disk, 8 which is rotated by a drive of which only the vertical shaft 23 is shown.

The treating agents are introduced into the reservoir 24 of the atomizing disk by the feeder structure 9, which comprises two annular passages 12, 13 and does not rotate with the disk 8, so that the reactants are mixed in the reservoir.

The mixture is centrifugally thrown out of the atomizing disk 8 through its bores 25 so that the mixture is admixed in a finely divided state to the gas stream.

Owing to the short length of the path which is jointly traversed by the treating agents in the reservoir 24 and in the bores 25 and the intense motion of the treating agents in that region, any chemical reaction between the treating agents cannot have undesired results, such as a formation of deposits and crusts.

Three illustrative embodiments of the feeder structure 9 are shown in FIGS. 3a -3c. Each feeder structure comprises a cylindrical outer wall 29 and a cylindrical inner wall 30. The annular space may be divided by a concentric partition into two annular passages 12, 13 (FIG. 3a), which through lines 10, 11 are separately supplied with water and suspended reactant and which discharge their contents through outlet openings 16, 17 into the atomizing disk 8.

In FIG. 3b, the annular space betWeen the walls 29, 30 is divided into passages 26, 27 by spiral partitions 31. Radial partitions 28 are provided in FIG. 3c. In both embodiments, the lines are again designated 10 and 11 and the outlet openings are designated 16 and 17.

I claim:

1. A method of removing a gaseous pollutant from a gas stream, comprising the steps of:
    (a) treating said gas stream in a spray absorber by
        ($a_1$) rotating an atomizing disk having a compartment at the bottom in said absorber;
        ($a_2$) introducing separately through the atomizing disk into the compartment at the bottom of said disk, water and a suspension in a liquid of particles capable of reacting with said gaseous pollutant to absorb said gaseous pollutant in said particles;
        ($a_3$) mixing the water and the suspension in said compartment at the bottom of said disk for a residence time sufficiently short to ensure that reaction products formed as the water is mixed with the suspension will not be able to deposit anywhere along a path along which they flow jointly before entering the gas stream; and
        ($a_4$) discharging into said gas stream in said absorber in an atomized spray, a mixture of the water and the suspension from atomizing nozzles of said disk during the rotation thereof to cool said gas stream and take up said gaseous pollutant in said particles while suspending said particles in said gas stream; and
    (b) thereafter collecting said particles from said gas stream in a dust collector.

2. The method defined in claim 1 wherein at least one further treating agent is fed to said rotating disk separately from said water and said suspension, and said further treating agent is mixed into said mixture in said compartment at the bottom of said disk and sprayed from said disk into said gas stream.

3. The method defined in claim 1 wherein said particles are electrostatically collected from said gas stream in step (b) in an electrostatic precipitator.

4. An apparatus for removing a gaseous pollutant from a gas stream, comprising:
a spray absorber including:
means forming an absorber chamber having a gas inlet and a gas outlet and adapted to be traversed by an exhaust gas stream introduced at said inlet,
a rotating atomizing disk centrally disposed in said chamber and having a vertical axis and a compartment at the bottom,
means including respective nonrotatable feeders disposed above said disk for separately introducing water and a suspension in a liquid of particles capable of reacting with said gaseous pollutant to absorb said gaseous pollutant in said particles through the disk into said compartment at the bottom, and
means communicating with the compartment at the bottom of said disk for discharging into said gas stream in said absorber in an atomized spray, a mixture of the water and the suspension from the compartment at the bottom of said disk during the rotation thereof to cool said gas stream and take up said gaseous pollutant in said particles while suspending said particles in said gas stream, and
a dust collector connected to said outlet and traversed by said gas stream downstream of said spray absorber for removing said particles from said gas stream.

5. The apparatus defined in claim 4 wherein said dust collector is an electrostatic precipitator.

6. The apparatus defined in claim 4 wherein said feeders comprise individual chambers separate from one another and connected to respective supply lines, each of said chambers being formed at its bottom with at least one opening communicating with said compartment at the bottom of the atomizing disk.

7. The apparatus defined in claim 4 wherein said feeders are constituted by a chamber in the form of a circular ring centered on said axis and divided by at least one partition into compartments each of which is connected to a respective supply line and is provided with a respective bottom opening discharging into said atomizing disk.

8. The apparatus defined in claim 7 wherein said partitions are radial.

9. The apparatus defined in claim 7 wherein said partitions are spiral shaped.

10. The apparatus defined in claim 7 wherein said partitions are concentric.

* * * * *